H. S. Vrooman,
Lasting Machine,
No. 7,761.  Patented Nov. 5, 1850.
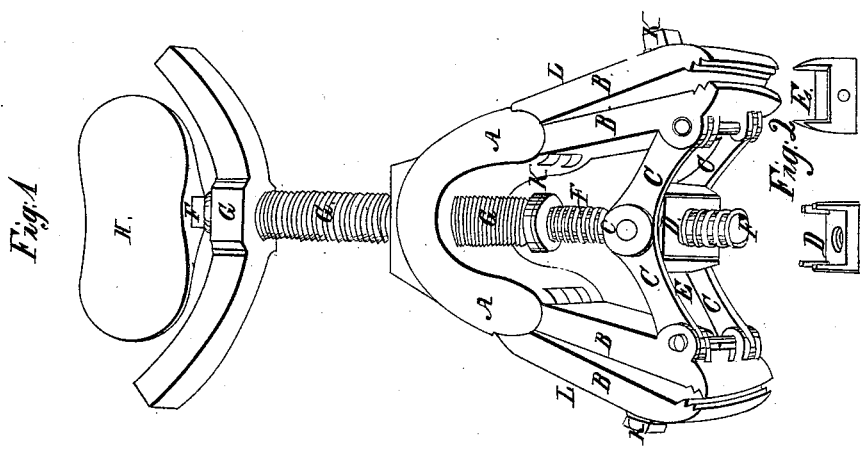
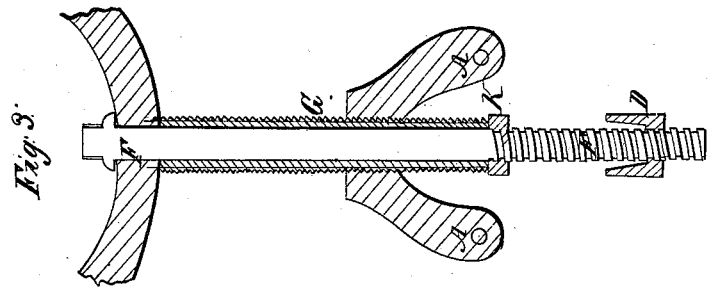

UNITED STATES PATENT OFFICE.

HENRY S. VROOMAN, OF SPRINGFIELD, MASSACHUSETTS.

CLAMP FOR GIRDING EMERY-WHEELS.

Specification of Letters Patent No. 7,761, dated November 5, 1850.

*To all whom it may concern:*

Be it known that I, HENRY S. VROOMAN, of Springfield, in the county of Hampden and State of Massachusetts, have invented a new and useful Machine for Girding Emery-Wheels and other Objects; and I do hereby declare the following to be a full and exact description of the construction and operation of the same, reference being had to the annexed drawing as forming part of this specification.

In Figure 1 of the drawings A, A, represents the arch or base of the machine.

B, B, B, B, the two pairs of jaws for holding the girding substance and attached to the arch by a hinge.

C, C, is the toggle joint which regulates the contraction or distention of the jaws.

D is a nut and E the holder by which the nut takes effect. G is a large screw which passes through the middle of the arch A in which it takes effect.

F is a smaller screw passing the entire length of the screw G and also passing down through the nut D where its power is applied.

H is a thumb piece also applicable to the screw heads K, K, which close the jaws separately. At L, L, is placed a spiral spring between the jaws to open them when the screw K is loosened.

D and E, Fig. 2, are the nut and holder detached.

Fig. 3 is a sectional view of the screws F and G. The larger screw G it will be seen acts only in the arch A, A. The smaller screw F passes the entire length of the screw G a simple rod, the thread being cut on a section of the lower end only. The ferrule K is attached to the screw F and turns with it the object being to confine the screw F within the screw G and also to form a basis on which the screw G rests when producing tension of the girding substance.

The usefulness and application of this machine is seen first in girding emery wheels with a band of leather. The operation is this: Let the band encircle the wheel and let the two ends be held by the two pairs of jaws B, &c., with the end of the screw F resting on the outer face of the wheel and pointing to its center. I now commence turning the center screw F to the left until the jaws of the machine begin to contract. I then turn the screw G to the right to counteract the closing of the jaws, then turning the screw F to the left again repeating the operation until the girding band is sufficiently tense. Then turning the screw G to the left which gives a compound motion to the jaws by closing them together and easing down to the face of the wheel.

I also apply the machine to the lasting of boots in the shank where an operation like that above described most perfectly stretches the upper leather and closes the same in the hollow of the last upon the inner sole. Also the machine is applicable to the crimping of boots with complete success.

What I claim as my invention and desire to secure by Letters Patent is—

The combination of the screws F and G and toggle joint C, C, with the jaws B, B substantially as herein described and set forth for the purpose of producing, first, tension of the girding substance, and then the compound motion of the jaws in closing together and settling down to the object on which the machine rests.

HENRY S. VROOMAN.

Witnesses:
E. W. BOND,
MORRIS BAILEY.